US005098503A

United States Patent [19]

Drake

[11] Patent Number: 5,098,503

[45] Date of Patent: Mar. 24, 1992

[54] METHOD OF FABRICATING PRECISION PAGEWIDTH ASSEMBLIES OF INK JET SUBUNITS

[75] Inventor: Donald J. Drake, Rochester, N.Y.

[73] Assignee: Xerox Corporation, Stamford, Conn.

[21] Appl. No.: 517,178

[22] Filed: May 1, 1990

[51] Int. Cl.[5] ........................ B25B 11/02; B23P 19/00

[52] U.S. Cl. ...................................... 156/299; 29/759; 156/257; 269/21; 269/293

[58] Field of Search ............... 156/299, 297, 257, 258; 346/140 R; 29/760, 759; 269/21, 293, 302; 148/DIG. 28

[56] References Cited

U.S. PATENT DOCUMENTS

| | | | |
|---|---|---|---|
| 3,706,129 | 12/1972 | McCann | 148/DIG. 28 |
| 4,479,298 | 10/1984 | Hug | 29/759 |
| 4,601,777 | 7/1986 | Hawkins et al. . | |
| 4,610,079 | 9/1986 | Abe et al. . | |
| 4,690,391 | 9/1987 | Stoffel et al. . | |
| 4,712,018 | 12/1987 | Stoffel et al. . | |
| 4,851,371 | 7/1989 | Fisher et al. . | |
| 4,878,992 | 11/1989 | Campanelli | 156/510 |
| 4,975,143 | 12/1990 | Drake et al. | 156/299 |

*Primary Examiner*—Michael W. Ball
*Assistant Examiner*—Daniel J. Stemmer
*Attorney, Agent, or Firm*—Oliff & Berridge

[57] ABSTRACT

A method of fabricating extended arrays of image reading or writing subunits and in particular a pagewidth thermal ink jet printhead from a plurality of discrete thermal ink jet printhead subunits is disclosed. Each thermal ink jet printhead subunit includes a heater plate subunit having a plurality of resistive elements on an upper surface thereof and a channel plate subunit having a plurality of channels corresponding in number and position to the resistive elements on a base surface thereof, the upper surface of the heater plate subunit being attached to the base surface of the channel plate subunit to define a thermal ink jet printhead subunit having a plurality of channels forming nozzles with a resistive element in communication with each channel. The method includes the steps of forming a precision alignment structure such as a notch with, for example, a precision dicing saw, on an upper surface of each channel plate subunit, placing the upper surface of each discrete thermal ink jet printhead subunit on an elongated alignment substrate having a plurality of corresponding alignment structures, and engaging the upper surface of each discrete thermal ink jet printhead subunit with one of the corresponding alignment structures on the alignment substrate. These steps are repeated with subsequent thermal ink jet printhead subunits until an extended array having the length of, for example, a pagewidth is formed. The array of thermal ink jet printhead subunits are then bonded to, for example, a base substrate to form an integral pagewidth printhead.

28 Claims, 2 Drawing Sheets

METHOD OF FABRICATING PRECISION PAGEWIDTH ASSEMBLIES OF INK JET SUBUNITS

BACKGROUND OF THE INVENTION

1. Field of the Invention

The present invention relates to methods of fabricating extended arrays of silicon wafer subunits, and more particularly to methods of forming pagewidth thermal ink jet printhead arrays from discrete thermal ink jet printhead subunits.

2. Description of Related Art

With the increased interest in rastor scanners, both to read and write images, has come renewed demand in the art for an economical full width scanning array. In the current stage of scanner technology, the art is without a commercially acceptable and economically feasible method of producing very long unitary scanning arrays, that is, single arrays of sufficient linear extent and with the requisite number of image processing elements to scan an entire line at once with a high image resolution. In this context, when speaking of scanning arrays, there are both image reading arrays which comprise a succession of image sensing elements such as, for example, photosites and supporting circuitry, to convert the image line to electrical signals or pixels, and image writing arrays which comprise a succession of light producing or other elements employed to produce images in response to an image signal or pixel input.

The prior art has faced this failure or inability to provide long full width scanning arrays with various proposals. These include optical and electrical arrangements for overlapping plural shorter arrays and abutting short arrays together in end-to-end arrangements. However, none of these proposals has met with any great degree of success. For example, in the case of abutting smaller arrays together, due to the difficulty of exactly aligning and mating the array ends with one another, losses and distortion of the images often occur.

A similar problem arises with thermal ink jet printing systems. Thermal ink jet printing systems use thermal energy selectively produced by resistors located in capillary filled ink channels near channel terminating nozzles or orifices to vaporize momentarily the ink and form temporary bubbles on demand. Each temporary bubble expels an ink droplet and propels it towards a recording medium. The printing system may be incorporated in either a carriage type printer or a pagewidth type printer. The carriage type printer generally has a relatively small printhead, containing the ink channels and nozzles. The printhead is usually sealingly attached to a disposable ink supply cartridge and the combined printhead and cartridge assembly is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. For an example of a cartridge type printer, refer to U.S. Pat. No. 4,571,599 to Rezanka. In contrast, the pagewidth printer has a stationary printhead having a length equal to or greater than the width of the paper. The paper is continually moved past the pagewidth printhead in a direction normal to the printhead length and at a constant speed during the printing process. Refer to U.S. Pat. No. 4,463,359 to Ayata et al for an example of pagewidth printing and especially FIGS. 17 and 20 therein.

Thermal ink jet printers include printheads, such as side shooter printheads shown in FIG. 1 and described in U.S. Pat. No. 4,601,777 to Hawkins et al (the disclosure of which is herein incorporated by reference). It is desirable to form these printheads having the width of a page to enable high speed printing to be performed. One method of forming these pagewidth printheads, illustrated in FIG. 1, involves butting together a plurality of printhead subunits $S_1$, $S_2$, $S_3$ to form a printhead array having the length of a pagewidth. With the sideshooter printhead, each printhead subunit includes a heater plate 2 having a series of resistive heater elements 3 located on an upper surface thereof attached to a channel plate 4 having a series of channels 6 located on a lower surface thereof and corresponding in number to the resistive heater elements. The end of each channel 6 forms a nozzle from which a drop of ink is outputted upon actuation of the corresponding resistive element 3. One method of forming such pagewidth printheads from an array of printhead subunits involves flipping each printhead subunit $S_1$, $S_2$, $S_3$ upside down and physically butting it to an adjacent printhead subunit. The channel plate 4 is etch delineated to be less wide than the heater plate 2, which can be precisely delineated by a precision dicing saw. With such a configuration, the channel plate plays no part in the physical butting process and only the precisely diced heater plate 2 determines the subunit-to-subunit placement accuracy. While this approach has the advantages of being simple and inexpensive, it has some less than ideal characteristics. For example, errors in the delineation of the heater plate 2 can accumulate over the length of the pagewidth printhead (cumulative chip-misalignment). Another disadvantage is that there is no way to incorporate thermal expansion gaps between adjacent subunits to ease problems of thermal expansion mismatch between the material used to form the subunits and the substrate to which the array is bonded. Another problem is that physically butting the chips could damage the heater plate edges which have circuitry nearby. This problem also applies to image reading arrays which have photosites or other image-detecting components adjacent their edges. A further problem is that if the precision diced edge of the heater plate 2 is not perfectly vertical, chip to chip stand off can result (that is, the upper surfaces of the heater plates 2 which contain the resistive elements will not be contiguous with one another thus causing uneven spacing of nozzles along the length of the printhead array).

U.S. Pat. Nos. 4,690,391 and 4,712,018 to Stoffel et al, the disclosures of which are herein incorporated by reference, disclose a method and apparatus for fabricating long full width scanning arrays for reading or writing images. For this purpose, smaller scanning arrays are assembled in abutting end-to-end relationship, each of these smaller arrays being provided with a pair of V-shaped grooves formed by orientation dependent etching (ODE) and located in an upper, component containing face thereof. An aligning tool having predisposed pin-like projections insertable into the grooves on the smaller scanning arrays is used to mate a series of smaller arrays in end-to-end abutting relationship. Discretely located vacuum ports in the aligning tool are used to draw the smaller arrays into tight face-to-face contact with the tool until a suitable base is affixed to base surfaces of the aligned arrays and the aligning tool withdrawn.

A limitation of the method of Stoffel et al is that the formation of grooves on the circuit surface of each smaller scanning array subunit can render the fabrication of many subunits from a single wafer difficult. In particular, etching the alignment grooves after formation of the circuitry on the subunit can damage the circuitry, while formation of the grooves prior to the circuitry requires that a photoresist layer be deposited on the entire surface of the wafer which renders the wafer surface non-planar. It is difficult to accurately form circuitry on a non-planar wafer. Additionally, both of these processes require the steps of applying and patterning a photoresist layer which takes time and increases costs. Further, since the planar surfaces of the (100) silicon wafers used in the method of Stoffel et al are not perfect (100) planes (due to ingot sectioning tolerances of $+/-\frac{1}{2}°$ in the process which slices these wafers from a larger silicon ingot), the grooves created by etching are not perfectly shaped and therefore may not properly mate with the corresponding alignment structure located on the aligning tool. Although Stoffel et al state that mechanical machining can be used to form the grooves, it would be difficult and time consuming to form these grooves with a dicing saw in the circuit surface of each subunit since the grooves cannot extend across the entire surface of the subunit due to the circuitry located thereon.

OBJECTS AND SUMMARY OF THE INVENTION

An object of the present invention is to provide a method of fabricating an extended array from a plurality of discrete subunits whereby each subunit is precisely located in the extended array.

Another object of the present invention is to provide a method of fabricating an extended scanning array from a plurality of discrete reading or writing subunits whereby a thermal expansion gap can be incorporated between each subunit in the array.

Another object of the present invention is to provide a method of fabricating an extended scanning array from a plurality of discrete reading or writing subunits whereby individual subunits never touch each other, thus eliminating the possibility of damaging the circuitry contained on these subunits.

A further object of the present invention is to provide a method of fabricating an extended scanning array from a plurality of discrete reading or writing subunits whereby individual chip misalignments are non-cumulative.

To achieve the foregoing and other objects, and to overcome the shortcomings discussed above, the present invention makes use of forming a precision alignment structure on a second surface of each discrete subunit, the subunit including a plurality of components such as, for example, photosites, heater elements or channels, on a first, opposite surface thereof, and aligning a plurality of discrete subunits into an extended array by placing the second surface of each discrete subunit onto an alignment substrate and engaging the precision alignment structure on each discrete subunit with a corresponding alignment structure on the alignment substrate. After an extended array of subunits having a desired length is formed, the discrete subunits are bonded, for example, to a base, to form, for example, an integral extended reading or writing array. By arranging the corresponding alignment structure on the alignment substrate so that adjacent alignment structures are spaced a distance apart from one another which is greater than the width of a discrete subunit, gaps can be provided between each discrete subunit in the extended array to allow for thermal expansion, prevent contact of adjacent subunits and prevent cumulative alignment errors. Additionally, by precisely forming the alignment structure extending from a front side to a rear side on the second surface of each subunit by using a precision dicing saw and the corresponding alignment structure on the alignment substrate by, for example, electroplating or thick film mask deposition techniques, each discrete subunit is precisely located within the extended array.

BRIEF DESCRIPTION OF THE DRAWINGS

A preferred embodiment of the invention will be described in detail with reference to the following drawings in which.

DESCRIPTION OF THE PREFERRED EMBODIMENTS

Figure 2:
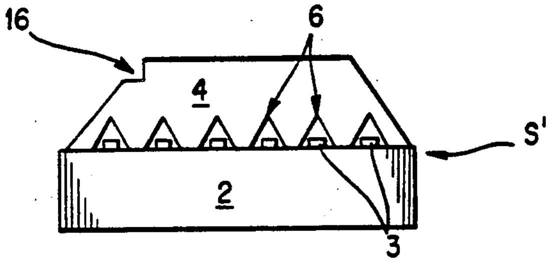
FIG. 2 is a front view of a printhead subunit including a notch in its upper surface which is usable in the present invention.

FIG. 2 shows a front view of a printhead subunit formed by a first method of the present invention. Subunit S' includes an actuator plate 2 which includes actuating elements 3 such as, for example, resistive heating elements having passivated addressing electrodes attached thereto and a channel plate 4 including a plurality of parallel channels 6 which form passageways between an ink nozzle and a supply of ink. Parallel channels 6 are formed on a first or base surface of channel plate 4 and can be supplied with ink by a fill hole (not shown) which extends through channel plate 4 from its upper, or second surface to the base surface and fluidwise communicates with channels 6. Ink could also be supplied to channels 6 from the sides or rear of channel plate 4. This printhead subunit can be formed by methods described in U.S. Pat. No. 4,851,371 to Fisher et al (the disclosure of which is herein incorporated by reference). In the present invention, the previously described methods of fabricating printhead subunits are modified to include the step of forming a precision alignment structure, such as notch 16, on the second, or upper surface of the channel plate 4. Notch 16 could have a depth on the order of 30 microns, although the depth dimension is not critical. Notch 16 is preferably formed by a precision dicing saw although other techniques can be used for forming notch 16 such as laser machining techniques or orientation dependent etching. An advantage of using a precision dicing saw is that notch 16 can be formed during the operation of dicing out the printhead from a silicon wafer so that no additional saw set up is required.

Figure 3:
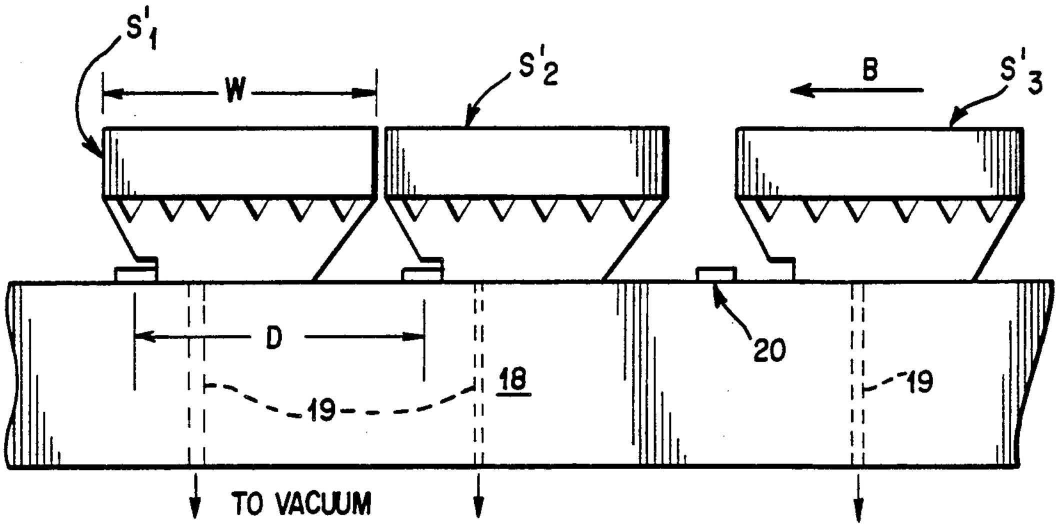
FIG. 3 is a front view of an assembly step of fabricating an extended array of subunits whereby subunits having a single notch in their upper surface are engaged with corresponding alignment structure on an alignment substrate.

Although the embodiment illustrated in FIGS. 2 and 3 show notch 16 to be formed in the edge of channel plate 4 and extending entirely across the upper surface of each channel plate from a front side to a rear side, it is understood that notch 16 could be formed anywhere in the upper surface of channel plate 4 as long as it does not interfere with the fill hole (if one exists) in the upper surface of channel plate 4. While formation of notch 16 in the edge of each channel plate is advantageous because it assures that the precision alignment structure is located in the same position relative to the components (in this example channels 6) for each subunit, when all of the subunits to be formed into an array will be fabricated from the same wafer, the formation of the notch on the edge of each subunit is not necessary. In particular, when a precision dicing saw is used to form the notches in the subunits during the operation of dicing out the printheads from a silicon wafer, the location of each notch on each printhead subunit relative to the channels in that subunit will be the same for every subunit formed from the same wafer because of the stepping accuracy of the precision dicing saw. That is, since the stepping accuracy of commercially available dicing saws is within $+/-\frac{1}{2}$ microns, the notch location will be the same relative to the channels for every subunit formed from the same wafer whether or not the notch is located on the edge of each channel plate. Thus, it is seen how the present invention makes use of high precision commercially available dicing saws to enable the formation of precisely aligned extended arrays of subunits.

Figure 1:
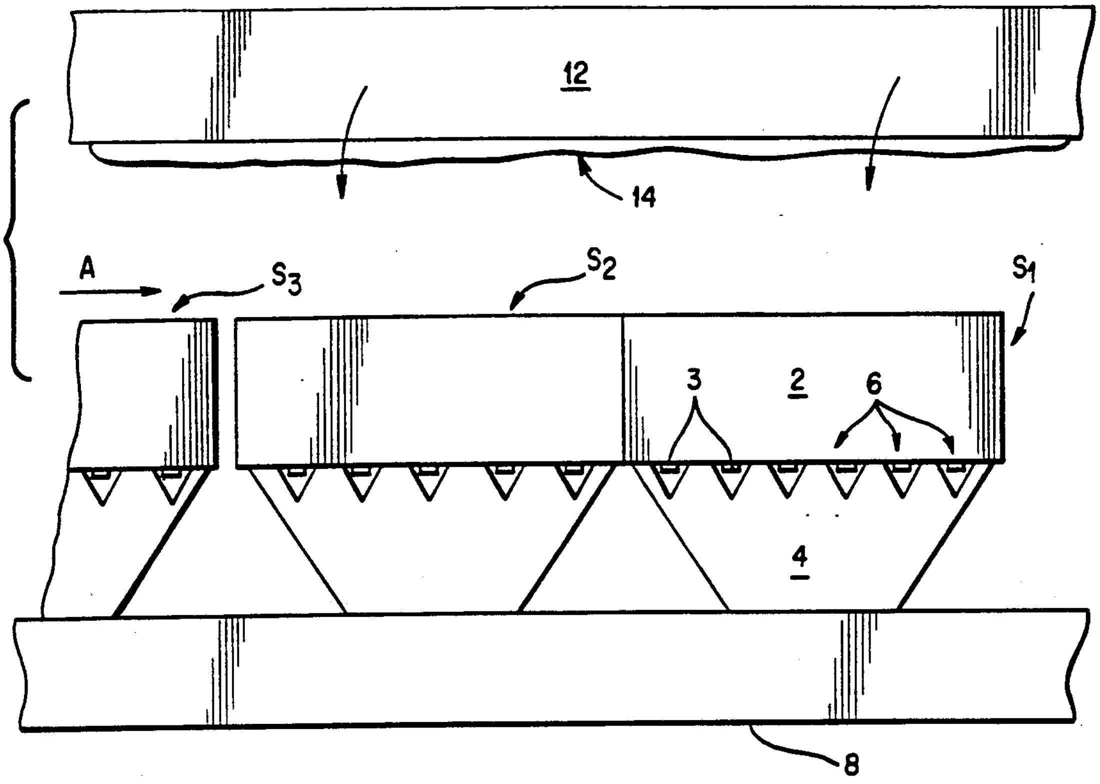
PRIOR ART FIG. 1
FIG. 1 is a front view illustrating a method of forming an extended printhead array by butting adjacent printhead subunits to one another.

As illustrated in FIG. 3, subunit $S'_1$ is then flipped as before but instead of physically butting the printhead subunit to a neighboring printhead subunit, the precision placed notch 16 is butted to a corresponding alignment structure such as detente 20 located on an upper surface of an alignment substrate 18. Once printhead subunit $S'_1$ is butted against detente 20, additional printhead subunits $S'_2$, $S'_3$ . . . $S'_N$ are butted against corresponding alignment substrates until an extended array of subunits having a desired length is formed. This operation can be performed using a modified commercial chip handling robot as described in U.S. Pat. No. 4,975,143 to Drake et al, issued on Dec. 4, 1990 and assigned to the same assignee as the present invention. The process disclosed in U.S. Pat. No. 4,975,143 forms a photoresist material layer to form keys or keyways in the photoresist material layer. Once the printhead subunit is pushed in place, a vacuum hold down locks its position until fabrication of the extended array is complete. The vacuum hold-down operates by applying a vacuum through bores 19 formed in alignment substrate 18. Bores 19 extend through alignment substrate 18 to the upper surface thereof so that the vacuum will be applied to each subunit to hold it in place. After an extended array of the desired length is formed, adhesive 14 (see FIG. 1) is applied to the bottom of the heater plate 2, at which point a bonding substrate 12 is applied to complete the mounting process. Adhesive 14 can be, for example, a heat curable adhesive.

Figure 4:
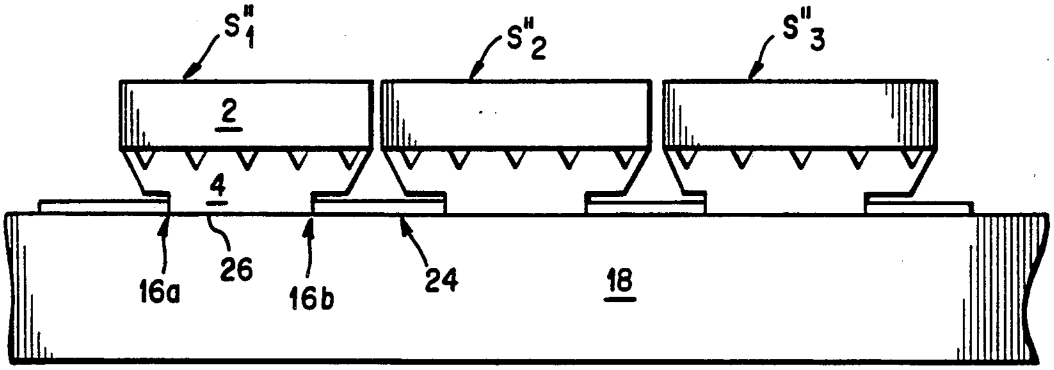
FIG. 4 is a front view of an assembly step in a method of fabricating an extended array of subunits whereby two notches are formed on the upper surface of a subunit which is engaged in slots formed on an alignment substrate.
Figure 5:
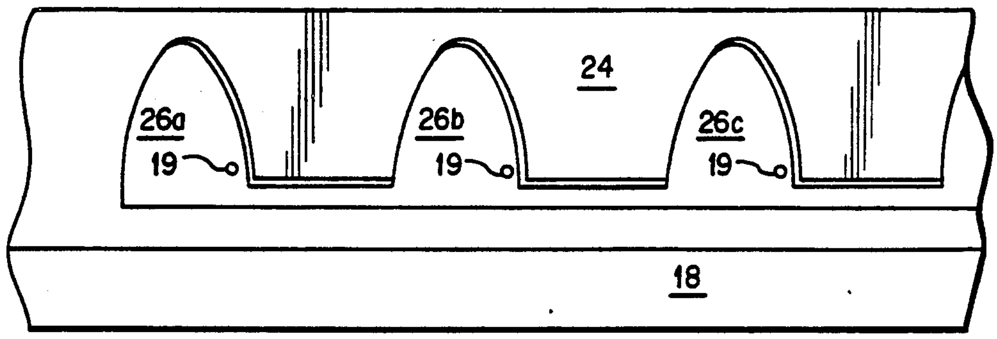
FIG. 5 is an isometric view of the alignment substrate used in the method illustrated in FIG. 4.

An alternative embodiment, wherein an alignment structure is formed on both sides of the upper surface of a channel plate, is illustrated in FIGS. 4 and 5. In this second embodiment, first and second notches 16a, 16b are formed on opposite sides of the upper surface of the printhead subunit $S''_1$, $S''_2$ . . . $S''_N$. The printhead subunit is then flipped and inserted into a slot 26 which is part of a raised pattern formed on the upper surface of alignment substrate 18. In this manner, first and second notches 16a, 16b contact first and second sides of the slot 26 so that the upper surface of the channel plate 4 is completely captured by the corresponding alignment structure.

The accuracy of alignment of each printhead subunit is limited by the precision with which the corresponding alignment structure is formed on the alignment substrate 18. By using precision deposition techniques such as electroplating to form detentes 20 or pattern 24 containing slots 26a, 26b, 26c . . . 26n, the positioning of each printhead subunit is highly accurate. Although electroplating is one preferred method of forming the corresponding alignment structure on alignment substrate 18, other processes such as thick film photopatterning techniques can also be utilized. By precisely locating each corresponding alignment structure on the alignment substrate 18, any discrepancies which exist in each printhead subunit S' or S'' do not accumulate, as in the butting method, but instead are limited to only the printhead subunit in which such discrepancies exist.

In the above described fabrication processes, the channel plates 4 have a width slightly less than each heater plate 2 and thus the width of each printhead subunit is equal to the width W of each heater plate 2. By spacing adjacent corresponding alignment structures 20 or 24 on alignment substrate 18 a distance D which is greater than the width W of each printhead subunit, a gap is provided between each printhead subunit. This gap prevents adjacent heater plate edges from touching one another, thus avoiding damage to the circuitry contained on heater plates 2 and also providing a thermal expansion gap between adjacent printhead subunits.

By utilizing an alignment substrate having a precisely formed alignment feature such as, for example, equally spaced detentes 20, the present invention allows precision, non-cumulative, non-contact alignment of printhead subunits to form a printhead array. Unlike previously used processes of butting adjacent subunits to one another, the present invention eliminates the cumulative errors that result when even a single subunit in an array has a non-uniform width or a non-vertical butting surface. With the present invention, each subunit is accurately located in the array of subunits. Additionally, use of the alignment feature on the alignment substrate eliminates the possibility of damage which can occur when adjacent subunits are butted to one another while allowing for the provision of expansion gaps in the printhead array.

While the present invention is described with reference to thermal ink jet printheads, this particular embodiment is intended to be illustrative, not limiting. For example, the present invention also finds use in the fabrication of ink jet printheads wherein the actuating elements on plate 2 are piezoelectric transducers. Additionally, the present invention can be utilized to form notches using a precision dicing saw in heater plates or image sensor subunits which are then aligned in an extended array. In particular, either a plurality of heating elements (as disclosed in the above-cited U.S. Pat. Nos. 4,601,777 to Hawkins et al and 4,851,371 to Fisher et al) or image sensing components such as, for example photosites (as disclosed in the above-cited U.S. Pat.

Nos. 4,690,391 and 4,712,018 to Stoffel et al) would be formed on a first surface of each subunit and one or more notches would be diced out of a second, oppositely facing surface of each subunit. In this example, the second surfaces of the subunits which contain the notch or notches could be bonded directly to the alignment substrate because the opposite (or first) surface of each subunit contains the active components (heating elements or photosites). If the subunit containing the precision diced notch is a heater plate, the heater plate could be aligned on and bonded to the alignment substrate either before or after having a channel plate bonded thereto. Channel plates having precision diced notches could also be aligned on the alignment substrate without having a heater plate bonded thereto, although the channel plates would not usually be bonded to the alignment substrate because they include an ink fill-hole on the second surface thereof. However, channel plates could be bonded to the alignment substrate if ink was supplied to each channel plate from the sides or from behind or if a fill-hole is also provided through the alignment substrate. See, for example, U.S. Pat. No. 4,612,554 to Poleshuk. The present invention can also be used to form pagewidth printheads wherein discrete printhead subunits are provided in a staggered arrangement on opposite sides of a common bonding substrate. Various modifications may be made without departing from the spirit and scope of the invention as defined in the appended claims.

What is claimed is:

1. A method of fabricating an extended array from a plurality of discrete subunits, said discrete subunits having first and second oppositely facing surfaces with a plurality of components on said first surface, said method comprising the steps of:

a) forming a precision alignment structure on at least one side of the second surface of each discrete subunit by dicing at least one notch in said at least one side of said second surface with a dicing saw;

b) placing the second surface of a discrete subunit on an elongated alignment substrate, said alignment substrate having a plurality of corresponding alignment structures;

c) engaging said at least one notch on the second surface of said discrete subunit with one of said corresponding alignment structures on said alignment substrate;

d) repeating steps (b) through (c), by placing subsequent discrete subunits on said alignment substrate until an extended array of subunits having a desired length is formed; and (e) bonding the discrete subunits to a support to form an integral extended array.

2. The method according to claim 1, wherein said corresponding alignment structure on said alignment substrate includes a series of equally spaced detentes, said engaging step including butting said notch against a corresponding detente.

3. The method according to claim 1, wherein a first notch is formed on said one side of the second surface of each discrete subunit and a second notch is formed on another side of the second surface of each discrete subunit.

4. The method according to claim 3, wherein said corresponding alignment structure on said alignment substrate includes a raised pattern having a series of equally spaced slots, said engaging step including inserting the upper surface of each discrete subunit into a corresponding slot so that said first and second notches are captured between first and second sides of said corresponding slot.

5. The method according to claim 1, wherein said discrete subunit has a width which is less than a distance between adjacent corresponding alignment structures on said alignment substrate so that the integral extended array includes expansion gaps between adjacent subunits.

6. The method according to claim 1, further comprising applying a vacuum through at least one vacuum hole associated with each corresponding alignment structure on the alignment substrate so that each discrete subunit is secured to said alignment substrate after engagement therewith.

7. The method according to claim 1, wherein said support is said alignment substrate, and one of said second surfaces of said plurality of discrete subunits and said alignment substrate has a curable adhesive applied thereon, said bonding step including curing said adhesive so that each discrete subunit is bonded to said alignment substrate.

8. The method according to claim 1, wherein said discrete subunits are image sensor subunits and said plurality of components is a linear array of photosites including supporting circuitry.

9. The method according to claim 1, wherein said discrete subunits are heater plate subunits and said plurality of components is an array of heating elements having passivated addressing electrodes.

10. The method according to claim 1, wherein said discrete subunits are channel plate subunits and said plurality of components is an array of channel forming grooves.

11. The method according to claim 1, wherein said at least one notch extends entirely across said second surface of each discrete subunit from a front side to a rear side of said second surface.

12. A method of fabricating an extended printhead array from a plurality of discrete printhead subunits, said printhead subunits comprising an actuator plate subunit including a plurality of actuating elements on an upper surface thereof and a channel plate subunit having a plurality of channels corresponding in number and position to said actuating elements on a base surface thereof, the upper surface of said actuator plate subunit being attached to the base surface of said channel plate subunit to define a printhead subunit having said plurality of channels with one of said actuating elements in communication with each channel, said method comprising the steps of:

a) forming a precision alignment structure on at least one side of an upper surface of each channel plate subunit;

b) placing the second surface of the channel plate subunit of a discrete printhead subunit on an elongated alignment substrate, said alignment substrate having a plurality of corresponding alignment structures;

c) engaging the precision alignment structure on the upper surface of said channel plate subunit of said discrete printhead subunit with one of said corresponding alignment structures on said alignment substrate;

d) repeating steps (b) through (c), by placing subsequent discrete subunits on said alignment substrate until an extended array of subunits having a desired length is formed; and (e) bonding the discrete subunits to a support to form an integral extended array.

13. The method according to claim 12, wherein said precision alignment structure is formed on both sides of the upper surface of each channel plate subunit.

14. The method according to claim 12, wherein said precision alignment structure is formed by dicing at least one notch on said at least one side of the upper surface of each channel plate subunit with a dicing saw.

15. The method according to claim 14, wherein a single notch is formed on one side of the upper surface of each channel plate subunit.

16. The method according to claim 15, wherein said corresponding alignment structure on said alignment substrate includes a series of equally spaced detentes, said engaging step including butting said notch against a corresponding detente.

17. The method according to claim 14, wherein a first notch is formed on said one side of said upper surface of each channel plate subunit and a second notch is formed on another side of said upper surface of each channel plate subunit.

18. The method according to claim 17, wherein said corresponding alignment structure on said alignment substrate includes a raised pattern having a series of equally spaced slots, said engaging step including inserting the upper surface of the channel plate subunit of each discrete printhead subunit into a corresponding slot so that said first and second notches are captured between first and second sides of said corresponding slot.

19. The method according to claim 12, wherein said actuator plates have a width which is less than a distance between adjacent corresponding alignment structures on said alignment substrate so that the integral extended printhead array includes expansion gaps between adjacent printhead subunits.

20. The method according to claim 12, further comprising applying a vacuum through at least one vacuum hole associated with each corresponding alignment structure on the alignment substrate so that each discrete printhead subunit is secured to the alignment substrate after engagement therewith.

21. The method according to claim 12, wherein said support is a host substrate, and said step of bonding comprises applying a curable adhesive to a base surface of said actuator plate subunits, contacting said host substrate with the base surface of said actuator plate subunits and curing said adhesive.

22. The method according to claim 12, wherein said actuator plate subunits are heater plate subunits and said actuating elements are heating elements having passivated addressing electrodes attached thereto.

23. The method according to claim 12, wherein said integral extended printhead array has a length corresponding to a width of a page.

24. The method according to claim 14, wherein said precision alignment structures extends entirely across said upper surface of each channel plate subunit from a front side to a rear side of said upper surface.

25. A method of fabricating a pagewidth thermal ink jet printhead from a plurality of discrete thermal ink jet printhead subunits, each thermal ink jet printhead subunit comprising a heater plate subunit having a plurality of resistive elements on an upper surface thereof and a channel plate subunit having a plurality of channels corresponding in number and position to said resistive elements on a base surface thereof, the upper surface of said heater plate subunit being attached to the base surface of said channel plate subunit to define a thermal ink jet printhead subunit having said plurality of channels with one of said resistive elements in communication with each channel, said method comprising the steps of:

a) forming a precision alignment structure on an upper surface of each channel plate subunit, said precision alignment structure being at least one notch formed by a precision dicing saw;

b) placing the upper surface of a discrete thermal ink jet printhead subunit on an elongated alignment substrate, said alignment substrate having a plurality of corresponding alignment structures;

c) engaging said at least one notch on the upper surface of said discrete thermal ink jet printhead subunit with one of said corresponding alignment structures on said alignment substrate;

d) repeating steps (b) through (c), by placing subsequent discrete thermal ink jet printhead subunits on said alignment substrate until a pagewidth printhead is formed; and e) bonding the discrete thermal ink jet printhead subunits to a base substrate to form an integral pagewidth printhead.

26. The method according to claim 25, wherein said at least one notch extends entirely across said upper surface of each channel plate subunit from a front side to a rear side of said upper surface.

27. The method according to claim 25, wherein said notch is formed on at least one side of the upper surface of each channel plate subunit.

28. The method according to claim 25, wherein a first notch is formed on one side of the upper surface of each channel plate subunit, and a second notch is formed on another side of the upper surface of each channel plate subunit.

* * * * *